April 9, 1935. H. SCHWARZE 1,997,471
LIGHTING CIRCUIT INDICATOR
Filed Aug. 24, 1928 2 Sheets-Sheet 1
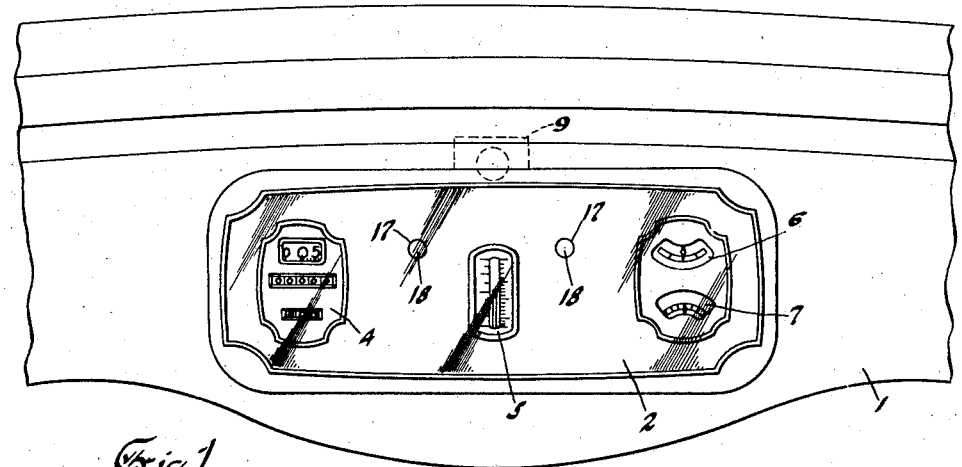
Fig.1
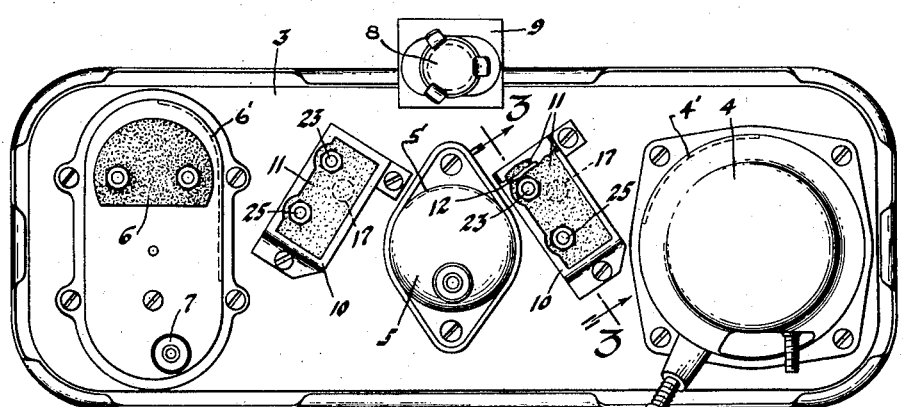
Fig.2
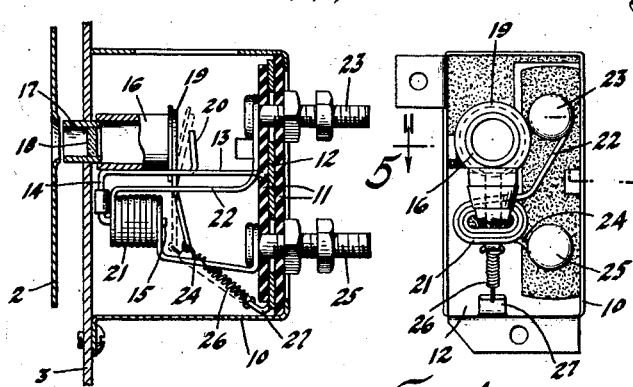
Fig.3 Fig.4
Fig.5
Inventor
Herman Schwarze
By Blackmore, Spencer & Fliel-
Attorneys April 9, 1935.　　　H. SCHWARZE　　　1,997,471
LIGHTING CIRCUIT INDICATOR
Filed Aug. 24, 1928　　　2 Sheets-Sheet 2

Inventor
Herman Schwarze
By Blackmore, Spencer & Hulse
Attorneys

Patented Apr. 9, 1935

1,997,471

UNITED STATES PATENT OFFICE 1,997,471

LIGHTING CIRCUIT INDICATOR

Herman Schwarze, Birmingham, Mich., assignor to General Motors Corporation, Detroit, Mich., a corporation of Delaware Application August 24, 1928, Serial No. 301,907

5 Claims. (Cl. 177—311)

This invention relates to indicators, and particularly to an electric lighting system for motor vehicles with which is associated an electrically actuated device that will readily enable ascertainment of the condition of the headlights.

Occasionally it happens that when an automobile is in use one of the light bulbs of the set will go bad and there are many drivers who cannot detect the fact, but they continue unknowingly to operate their cars with only one light burning. No car operator wishes to drive under such conditions because he not only does not secure proper lighting for his own guidance, but he hazards travel for the driver of an approaching vehicle in that the oncoming driver is liable to become confused as the width of the roadway and the amount of clearance he must allow so that the two cars can safely pass each other.

To provide a warning of headlight failure that may be readily observed to enable the fault to be corrected without unnecessary delay, and thus eliminate the danger incident to driving with only a single light, is one of the objects of the present invention.

Other objects will become apparent from the following specification when taken in connection with the accompanying drawings, wherein Figure 1 is an elevation of a mounted instrument assembly.

Figure 2 is a rear view of the instrument assembly.

Figure 3 is a section on line 3—3 of Figure 2.

Figure 4 is a front view of the device shown in Figure 3.

Figure 5 is a section taken on line 5—5 of Figure 4.

Figure 6:
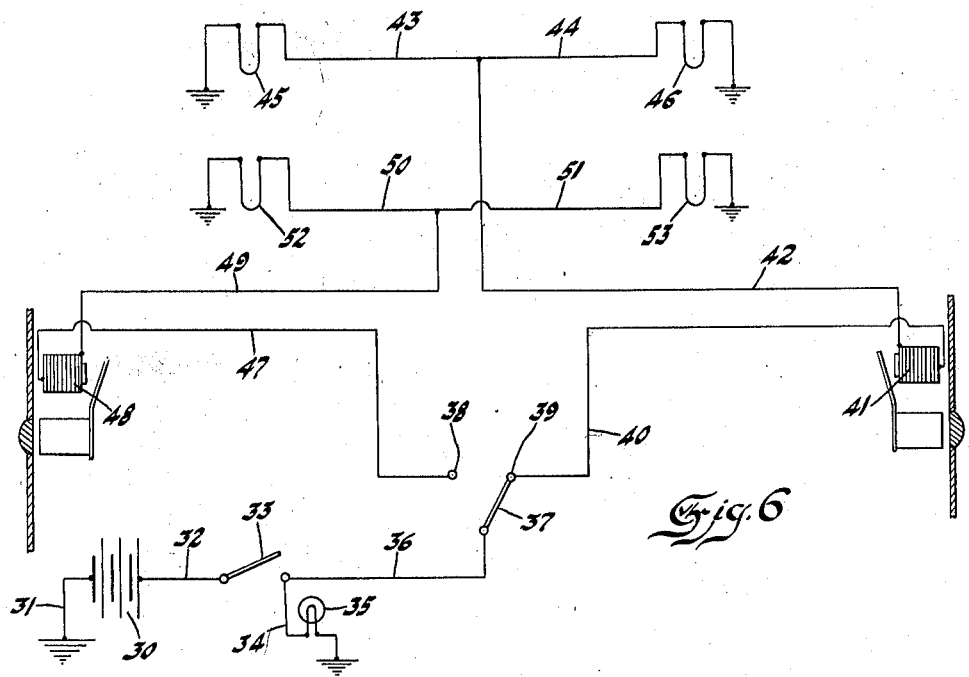
Figure 6 is a diagrammatic view of a lighting circuit.

In the accompanying drawings, reference character 1 indicates the instrument board or panel of an automobile having thereon the grouped instrument assembly which includes a face plate 2 and a backing plate 3, to which are secured the several instruments. In the present case the backing plate carries a speedometer 4, a fuel level gauge 5, an ammeter 6 and an oil pressure gauge 7. The casings or containers of the several instruments are provided with windows 4', 5' and 6' through which project light rays from a bulb 8 positioned within a socket 9 in the rear of the instrument panel 1 to afford an indirect lighting of the faces of the several instruments. Also secured on the backing plate 3 are two casings 10—10 that are identical in structure so that only one need be described in detail. The rear wall of the casing 10 consists of two plates 11 of insulating material having interposed therebetween a member or plate 12 which may be formed from sheet metal. The plate 12 has a portion thereof at one side struck upwardly to form a leg 13 having at its end angularly bent portions 14 and 15. Secured to the leg 13, as by soldering, is a tubular member 16 that is brought into alignment with a member 17 carrying a disc 18 of colored glass, pyrolin, or the like. The leg 13 also has a slot through which extends the tongue of the shutter or closure member 19 positioned over the end of the tube 16, which when opened to the dotted line position shown in Figure 3, where it abuts stop 20, permits light from the instrument bulb to be reflected or passed through the tube 16 and colored lens or disc 18. The shutter is opened by means of an electromagnet formed by the coil 21 surrounding the portion 15 and connected through the lead 22 to the connector stud 23, and having its opposite end connected through the lead 24 with the connector stud 25. Normally the shutter is held in closed position under influence of the tension spring 26, having its opposite ends connected with the end of the shutter and with an ear 27 struck up from the plate 12. The coil 21 is intended for insertion in series with one set of two headlamp filaments. When the current passing through the circuit containing this coil is sufficient to light both filaments in the circuit, a magnetic attraction is induced by the coil 21 to move the shutter 19 away from the end of the tube 16 so as to allow light rays to illuminate the disc 18. In the event, however, one of the bulbs should burn out or the wiring become loose, the current flow to light a single filament will not be sufficient to create a magnetic attraction strong enough to overcome the tension of the spring 26, whereupon the shutter 19 will close the tube against the passage of light rays and the automobile driver by observing the colored disc on his instrument panel will be apprised of the fact that his lights are not operating properly. Since most motor vehicles have two sets of lights giving either an upward or bright beam, or a downward or dim beam, it is proposed to use one of the devices in each circuit. These two devices may be placed on the instrument panel in a certain spaced relation and the respective lenses may be colored differently so that the driver can readily distinguish between the two and know which set of lights he is burning.

To better illustrate the installation of the device in the lighting system a diagrammatic layout is illustrated in Figure 6, wherein the reference character 30 indicates a source of electrical energy such as a storage battery, one terminal of which is grounded by the current conducting wire 31, while the other terminal is connected by the wire 32 with a switch 33. The switch 33 may be placed at any convenient point such as on the instrument panel, and when closed, it permits current from the battery to flow through the line 34 to the instrument light 35 and also through the line 36 to a two-way switch 37. The two-way switch is preferably located on the floor board where it may be readily operated by the driver's foot and its construction is such that it is always on one or the other of the two contact points 38 and 39. From the point 39 the current flows through the conductor 40, coil 41, conductor 42 and branch lines 43 and 44 to the filaments 45 and 46, respectively. When the switch lever is thrown over into contact with the point 38, the current flows through the line 47, coil 48, line 49 and branch conductors 50 and 51, leading to the filaments 52 and 53, respectively. The filaments 45 and 46 constitute one set, and filaments 52 and 53 the other set. The lights are turned on by the switch 33, the switch 37 merely directing the current to one or the other sets of filaments to give either the upper or lower beam as desired. When current is flowing to a set of filaments the magnetic attraction induced in the electro-magnet inserted in series with that particular set of filaments will draw the shutter open to allow light rays from the instrument bulb to reach the colored lens. Should the current flow drop because of defective wiring or burned out bulb, the magnetic attraction will be lessened to a point where it fails to attract the shutter, thereby excluding light rays to the colored lens and providing a visional indication to the automobile driver.

Figure 7:
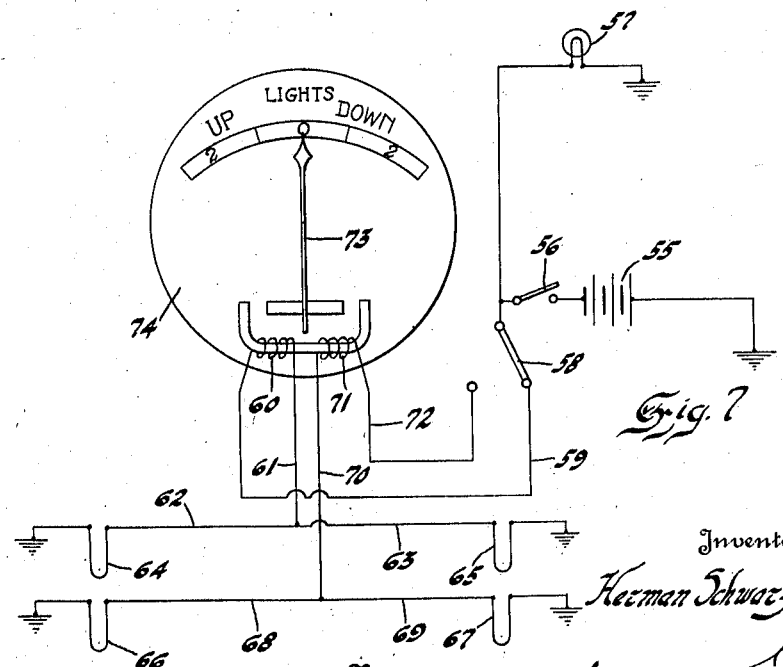
Figure 7 is a diagrammatic view of a circuit and illustrates a modification.

In lieu of using a lighted lens as an indicator, the special type of ammeter shown in Figure 7 may be employed. In this case the battery 55 is connected by a control switch 56 with instrument light 57 and to a switch 58. A conductor line 59 leads the current through a coil 60 from whence it flows through the line 61 and branch conductors 62 and 63, to the filaments 64 and 65. The other set of filaments 66 and 67 are connected by branch lines 68 and 69 with the line 70, coil 71 and line 72 with the two-way switch 58. The coils 60 and 71 inserted in series with the respective sets of filament are wound in opposite directions so that the current flow through one tends to move the indicator hand 73 across the graduated scale 74 in a direction opposite to that in which it would be moved if current were flowing through the other coil. From the central intermediate point which is marked zero and indicates no current flow in the lighting circuits, the scale is graduated in both directions by the numerals one and two, the numerals to one side indicating respectively that one bright filament or two bright filaments are lighted, depending on the current flow through into the filaments through the field coils, and similarly the markings on the other side of the diagram indicating that one or both of the filaments giving the downward beam are lighted.

Various changes in the construction may be made as will be obvious to those skilled in the art.

I claim:

1. In a lighting circuit, an indicating device comprising in combination, a supporting plate providing an inspection aperture, a housing mounted on the plate and disposed over the inspection aperture, said housing having an opening, dielectric means closing the housing opposite the inspection aperture, a source of illumination arranged outside of the housing so that the rays therefrom are projected through the opening substantially flooding the inside of the housing and electromagnetic means supported from the dielectric means and including a pivoted shutter for controlling the passage of illumination to said inspection aperture.

2. In a lighting circuit, an indicating device comprising in combination, a supporting plate providing an inspection aperture, a housing mounted on the plate and disposed over the inspection aperture, said housing having an illumination opening and situated to face a source of illumination, an illuminating source situated without the housing for flooding the parts within the housing, a bracket supported from the back of the housing and carrying a tubular member axially aligned with the inspection aperture, an electromagnet winding wound about one end of the bracket, and connected into the circuit, and a shutter bearing armature pivoted upon the bracket for closing one end of the tube, said shutter when the electromagnet winding is energized operating to direct light rays from the illumination aperture through said tubular member.

3. In a lighting circuit, including a concealed source of illumination, an indicating device comprising in combination, a supporting plate providing an inspection aperture, a housing mounted on the plate and disposed over the inspection aperture, said housing having an illumination opening and situated to face the source of illumination, a bracket supported from the back of the housing and carrying a tubular member axially aligned with the inspection aperture, said bracket having its end adjacent the tube bent into U-form, a magnet winding disposed over the terminating lug of the U portion of the bracket, and a shutter bearing armature pivoted upon the bracket so as to have extending portions one each of which extends over the end of the tube and the magnet winding, said shutter bearing armature operable upon energization of the magnet winding to admit light rays from the illumination source to be directed through said tube.

4. In a lighting circuit, an indicating device comprising in combination, a supporting plate providing an inspection aperture, a housing mounted on the plate and disposed over the inspection aperture, an illuminating source, said housing having an illumination opening and situated to face the source of illumination, a bracket supported from the back of the housing and carrying a tubular member axially aligned with the inspection aperture, said bracket having its end adjacent the tube bent into U-form, a magnet winding disposed over the terminating lug of the U portion of the bracket, and a shutter bearing armature pivoted intermediate the tube and magnet winding and normally urged to close the end of said tube, said magnet winding operating upon energization of the lighting circuit to move the shutter from the end of the tube whereby light rays from said source may be directed to the inspection aperture.

5. In a system for illuminating the path of travel of a motor vehicle or the like, having a pair of head lamps spaced apart, a high beam filament and low beam filament in each lamp adapted for independent lighting, the combination of electrically operated means inserted in series with each lamp circuit for indicating the condition of said circuit, said means comprising a support for providing an inspection aperture, a housing providing a laterally disposed illumination receiving aperture disposed over the inspection aperture, an illuminating source adapted to cast its light rays through the illumination receiving aperture on the parts within the housing, a tubular member with a movable cap disposed in alignment with said inspection aperture, a magnet winding, a bracket, one end of which forms a core for said winding supporting the winding and tubular member in substantial parallelism, an armature pivoted upon the bracket and supporting the movable cap, and dielectric means carried by the side wall of the housing opposite the inspection aperture for supporting said bracket, and means urging the cap into engagement with the end of the tube but yieldable upon energization of the magnet winding so as to direct light rays from the illumination receiving aperture through the said tube to the inspection aperture.

HERMAN SCHWARZE.